United States Patent [19]

Lyman et al.

[11] Patent Number: 5,045,272

[45] Date of Patent: Sep. 3, 1991

[54] FLUID TEMPERATURE BALANCING SYSTEM

[75] Inventors: Walter G. Lyman, Monroeville; Michael D. Heibel, Plum Borough, both of Pa.

[73] Assignee: Westinghouse Electric Corp., Pittsburgh, Pa.

[21] Appl. No.: 481,038

[22] Filed: Feb. 16, 1990

[51] Int. Cl.⁵ .............................................. G21C 7/32
[52] U.S. Cl. .................................... 376/211; 376/210; 376/247
[58] Field of Search ........................ 376/211, 210, 247

[56] References Cited

U.S. PATENT DOCUMENTS

| | | | |
|---|---|---|---|
| 4,104,117 | 8/1978 | Parziale et al. | 376/211 |
| 4,478,783 | 10/1984 | Broadwater | 376/211 |
| 4,728,481 | 3/1988 | Geets | 376/211 |
| 4,777,009 | 10/1988 | Singh et al. | 376/211 |
| 4,912,732 | 3/1990 | Singh | 376/210 |

Primary Examiner—Brooks H. Hunt
Assistant Examiner—Meena Chelliah

[57] ABSTRACT

A steam generating system including a heat energy source, a feedwater heating section including at least one heat exchange unit (2) having a feedwater inlet, a device (10) for supplying feedwater to the feedwater inlet of the heat exchange unit (2), and a steam generating section composed of at least two steam generating heat exchange units (4) each having a feedwater inlet connected for receiving heated feedwater from the feedwater heating section and each connected to the heat energy source for transferring heat from the energy source to the feedwater. The system further includes: a bypass conduit (12,14) connected between the feedwater inlet of the feedwater heating section heat exchange unit (2) and the feedwater inlet of each the steam generating heat exchange unit (4); and a flow control device (18) connected in the bypass conduit (12,14) between the inlet of the feedwater heating section and each of the steam generating heat exchange units (4) for individually controlling the rate of flow of feedwater via the bypass conduit (12,14) to the feedwater inlet of each steam generating heat exchanger unit (4).

14 Claims, 1 Drawing Sheet

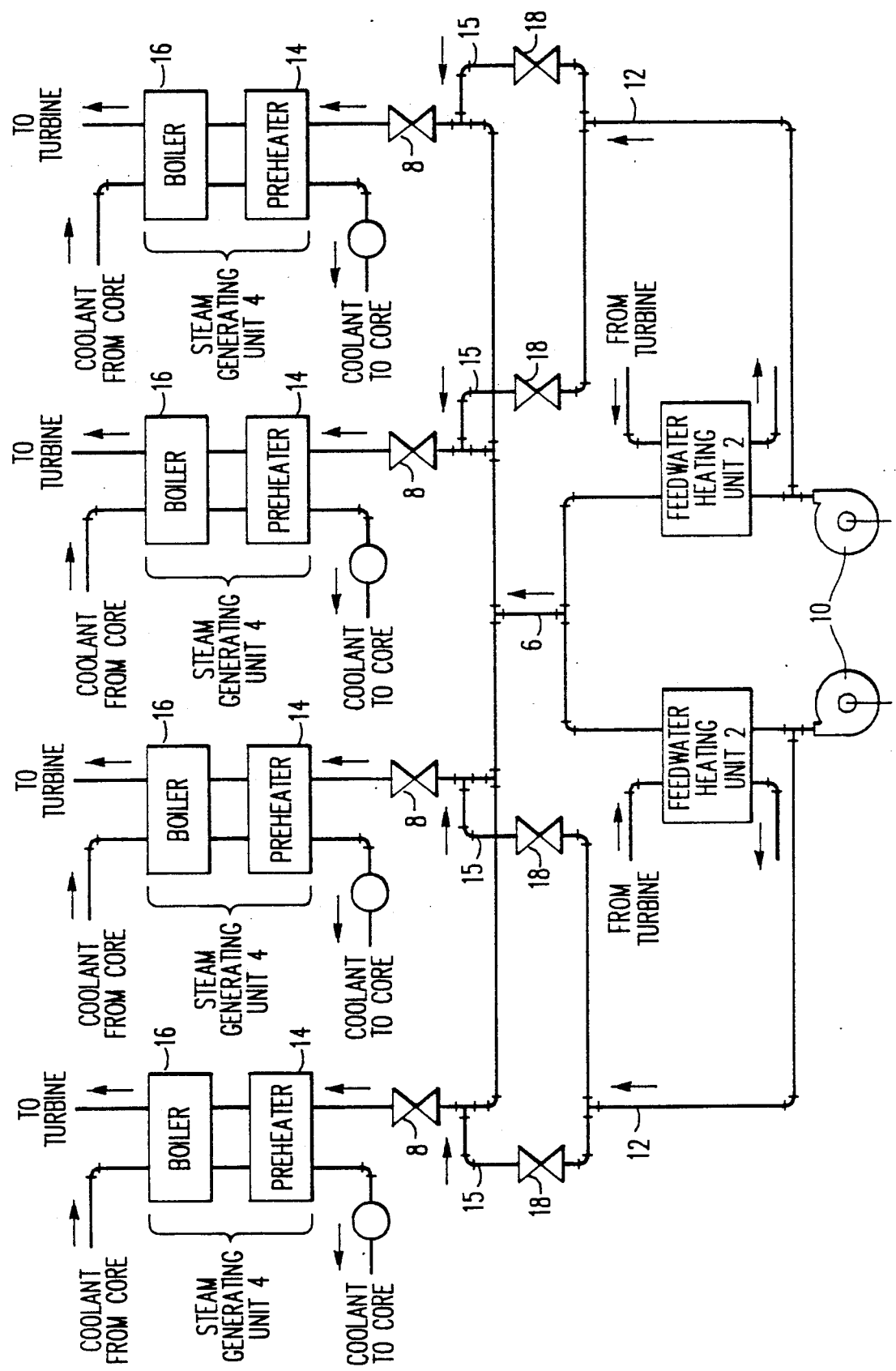

FLUID TEMPERATURE BALANCING SYSTEM

BACKGROUND OF THE INVENTION

The present invention relates to fluid flow systems, and in particular nuclear reactor coolant systems.

In many nuclear power plants, power is generated in a plurality of individual loops, and differences will typically exist between loops as regards temperatures and steam generation rates. Such differences may be caused by differences in reactor coolant flows, steam generator heat transfer rates and steam piping differential pressures.

As a result of such differences, the coolant temperature at the inlets to the reactor core is not uniform, and this will cause at least small differences in power distribution and fuel burnup across the core. The relative differences in power distribution increase as system power demand decreases, and can reach levels at which power distribution alarms are initiated, indicating that some corrective measures must be taken.

Many reactor installations having a plurality of coolant loops are equipped with a steam generating system composed of a plurality of steam generators, one for each coolant loop, and a feedwater heating system composed of pumps and heat exchangers to supply heated feedwater to the steam generators. It is known that the overall heat transfer behavior of the steam generating system can be adjusted by varying the temperature of the feedwater supplied to the steam generators. This control capability has been considered for improving power availability when reactor core burnup is being extended beyond the normal fuel cycle burnup. However, in existing systems, all steam generators receive feedwater at the same temperature.

SUMMARY OF THE INVENTION

It is an object of the present invention to eliminate, or at least substantially reduce, coolant temperature differences at the inlets to a reactor core.

Another object of the invention is to eliminate, or at least substantially reduce, differences in power generated in individual loops of a nuclear reactor system.

The above and other objects are achieved, according to the present invention, in a steam generating system, which system includes a heat energy source, a feedwater heating section including at least one heat exchange unit having a feedwater inlet, means for supplying feedwater to the feedwater inlet of the heat exchange unit, and a steam generating section composed of at least two steam generating heat exchange units each having a feedwater inlet connected for receiving heated feedwater from the feedwater heating section and heat from the energy source, by the improvement comprising means defining a bypass conduit connected between the feedwater inlet of the feedwater heating section heat exchange unit and the feedwater inlet of each the steam generating heat exchange unit; and flow control means connected in the bypass conduit between the inlet of the feedwater heating section and each of the steam generating heat exchange units for individually controlling the rate of flow of feedwater via the bypass conduit to the feedwater inlet of each steam generating heat exchanger unit.

BRIEF DESCRIPTION OF THE DRAWING

The sole FIGURE is a schematic diagram of a reactor coolant flow system equipped with a preferred embodiment of the present invention.

DESCRIPTION OF THE PREFERRED EMBODIMENTS

The FIGURE illustrates a multiple loop steam generating system composed of a feedwater heating section including two heat exchange units 2 for heating incoming feedwater and a steam generating section including a plurality of steam generating heat exchange units 4 connected to a common conduit 6 which distributes heated water from units 2 to steam generating units 4. Units 4 supply steam to respective inlets of the first stage of a turbine. Between conduit 6 and each generating unit 4 there is provided a main feed line containing a main feed control valve 8, which will be controlled automatically by a computerized system such as those currently employed in power generating installations of the type in which the present invention is to be employed.

Feedwater is supplied to each feedwater heating unit 2 via a respective main feed pump 10 from a reservoir which may be supplied by the condensate produced after the steam generated in the system has given up its energy in the turbine.

Each unit 4 is composed of two heat exchangers, a preheater 14 and a boiler 16, connected in cascade. Coolant in each reactor loop is conducted in countercurrent flow first through boiler 16 an then through preheater 14 of a respective unit 4.

While, nominally, water at the same temperature and flow rate can be supplied to each of steam generating units 4, the result can be the achievement of different temperatures or the generation of different loop power levels because of the previously described differences between loops, which differences are often impossible, or at least quite difficult, to eliminate in existing systems.

Such outlet temperature or power generation differences cannot be satisfactorily compensated simply by adjusting feedwater flow rate, which must be controlled to maintain the requisite water level in the steam generating units, because this would unduly alter the thermal balance in the other loops.

According to the present invention, the capability of correcting such temperature or power differences is provided by bypass lines 12 each extending from the outlet of each pump 10, and connecting lines 14 each including a controllable valve 18 and each connecting the inlet end of a respective generating unit 4 to a respective bypass line 12.

In the illustrated embodiment, where there are two feedwater heating units 2 and four steam generating units 4, each bypass line 12 is connected, via respective connecting lines 14, to two steam generating units 4.

With the arrangement illustrated in the FIGURE, each valve 18 can be controlled to bypass a desired fraction of feedwater around a preheating unit 2 and directly into the main feed line feeding a respective steam generating unit 4, making possible a balancing of loop temperatures at the reactor core inlets or the total energy transferred to the feedwater in unit 4 of each loop. Thus, by simple control of valves 18, it becomes possible to successfully resolve core coolant inlet temperature or power distribution problems.

To effect small changes in the temperature of the coolant arriving at a reactor core inlet, it is sufficient to adjust the temperature of the feedwater supplied to the unit 4 associated with that loop, a reduction in feedwater temperature resulting in an increased heat transfer in unit 4 and thus a reduction in the temperature of the coolant exiting from unit 4.

If the temperature of the feedwater supplied to a steam generating unit must be changed substantially, and the feedwater must be converted to steam above a minimum temperature, the rate of flow of feedwater to the steam generating section must be changed. Specifically, a reduction in feedwater temperature requires a reduction in feedwater flow rate This will be controlled by means of the main feed control valve 8 associated with that steam generating section 4.

It should be noted that when the temperature and flow rate of the feedwater supplied to a steam generating unit 4 is reduced, a larger proportion of the heat transfer occurring in that unit will take place in preheater 14 and, correspondingly, a smaller proportion will take place in boiler 16. Since boiler 16 thus extracts less heat from the reactor coolant, the average temperature of the coolant in the boiler is higher, tending to cause the steam temperature and pressure to be higher. However, since the steam generating unit steam outlets are combined in a common header, the steam pressure in all a steam generating units is the same. The higher average coolant temperature in one boiler will thus result in the generation of additional steam, thereby causing feedwater flow and loop power to increase to higher stady-state values. The higher loop power in turn causes the coolant outlet temperature from the steam generating unit, and thus the core inlet temperature, to decrease.

According to the invention, the coolant temperature at each reactor core inlet, which can be monitored by a temperature sensor 20 normally provided in such installations, can be adjusted by varying the temperature of the feedwater supplied to the steam generating unit 4 of the associated loop, a reduction in the feedwater temperature with no substantial change in feedwater flow rate leading to an increased heat exchange in unit 4 and a reduction in coolant temperature at the associated reactor core inlet. In a typical installation, the coolant temperature sensors can be monitored visually and the necessary adjustment of valves 18 can me made manually.

It would be expected that any feedwater temperature change in one loop will alter the thermal balance in the other loops. However the effect of such alteration will be small since it will be divided among the other loops. Where necessary, such changes can be compensated by adjusting the valves 8 and 18 of the other loops.

Adjustment of valves 18 may also be used to balance all loops with respect to total heat transfer between coolant and feedwater. For this purpose, the total heat transfer in each loop may be determined in a known manner on the basis of measurements of feedwater flow rate, feedwater temperature at the inlet to unit 4 and steam pressure at the outlet of unit 4. Then, the heat transfer occurring in any selected loop can be altered by adjusting the flow thought the associated valve 18.

The principle of the invention could also be used to facilitate balancing of feedwater flows in plants which are not equipped with preheating heat exchange units, i.e., where each unit 4 does not include a preheater 14. This could help to prevent the occurrence of a high moisture carryover in the steam flow from a generator having an undesirably high feedwater flow.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a steam generating system, which system includes a heat energy source, a feedwater heating section including at least one heat exchange unit having a feedwater inlet, means for supplying feedwater to the feedwater inlet of the heat exchange unit, and a steam generating section composed of at least two steam generating heat exchange units each having a feedwater inlet connected for receiving heated feedwater from the feedwater heating section and each connected to the heat energy source for transferring heat from the energy source to the feedwater, the improvement comprising means defining a bypass flow path connected between said feedwater inlet of said feedwater heating section heat exchange unit and said feedwater inlet of each said steam generating heat exchange unit, said bypass flow path defining means including two controllable valves each connected between said feedwater inlet of said feedwater heating section heat exchange unit and a respective steam generating heat exchange unit for individually controlling the rate of flow of feedwater via said bypass flow path to said feedwater inlet of each said steam generating heat exchange unit.

2. A system as defined in claim 1 wherein each said steam generating heat exchange unit comprises a preheater and a boiler connected together in cascade.

3. A system as defined in claim 2 wherein the heat energy source supplies a heated medium and each said steam generating heat exchange unit is constructed and connected for conducting the heated medium first through said boiler and then through said preheater.

4. A system as defined in claim 3 wherein each said steam generating heat exchange unit is constructed and connected for conducting the heat exchange medium through both said boiler and said preheater in countercurrent to the feedwater.

5. A system as defined in claim 3 wherein the heat energy source is a nuclear power reactor having a core and the heated medium is a reactor coolant which flows through the core.

6. A system as defined in claim 5 wherein the coolant is pressurized water.

7. A system as defined in claim 1 wherein the heat energy source is a nuclear power reactor having a core and a body of coolant which flows through the core and through each said steam generating heat exchange unit.

8. A system as defined in claim 7 wherein the coolant is pressurized water.

9. A system as defined in claim 1 wherein: said feedwater heating section has two said heat exchange units, said steam generating section has four said steam generating heat exchange units, said system further comprises a header connecting said two heat exchange units of said feedwater heating section to said four steam generating heat exchange units of said steam generating section, and there are four said controllable valves each connected between one said heat exchange unit of said feedwater heating section and a respective steam generating heat exchange unit of said steam generating section.

10. A method of operating a steam generating system, which system includes a heat energy source, a feedwater heating section including at least one heat exchange unit having a feedwater inlet, means for supplying feedwater to the feedwater inlet of the heat exchange unit, and a steam generating section composed of at least two steam generating heat exchange units each having a feedwater inlet connected for receiving heated feedwater from the feedwater heating section and each connected to the heat energy source for transferring heat from the energy source to the feedwater, said method comprising causing a selected portion of feedwater to bypass the feedwater heating section and to flow directly from the feedwater inlet of the heat exchange unit of the feedwater heating section to the feedwater inlet of each steam generating heat exchange unit, and independently controlling the flow, to each steam generating heat exchange unit, of feedwater which bypasses the feedwater heating section.

11. A system as defined in claim 1 wherein the heat energy source supplies a heated medium which flows through each said steam generating heat exchange unit, and said valves are controlled for reducing temperature differences between the media leaving said steam generating heat exchange units.

12. A system as defined in claim 1 wherein said valves are controlled for reducing differences between said steam generating heat exchange units with respect to the total energy transferred to feedwater in each said steam generating heat exchange unit.

13. A method as defined in claim 10 wherein the heat energy source supplies a heated medium which flows through each said steam generating heat exchange unit, and step of controlling is carried out to reduce temperature differences between the media leaving said steam generating heat exchange units.

14. A method as defined in claim 10 wherein said step of controlling as carried out to reduce differences between said steam generating heat exchange units with respect to the total energy transferred to feedwater in each said steam generating heat exchange unit.

* * * * *